Jan. 30, 1962 G. E. DUNLOP 3,018,663
FURNACE LINING TEMPERATURE-THICKNESS MEASURING APPARATUS
Filed Sept. 13, 1956 2 Sheets-Sheet 1
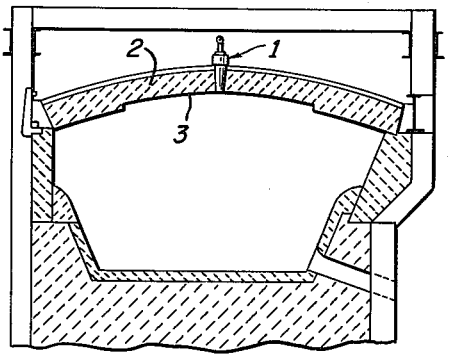
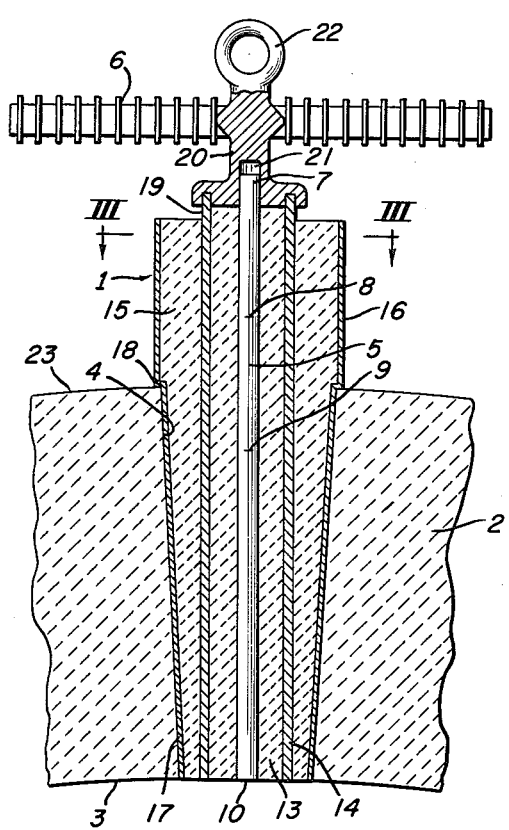
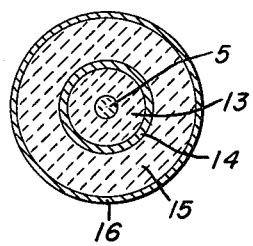
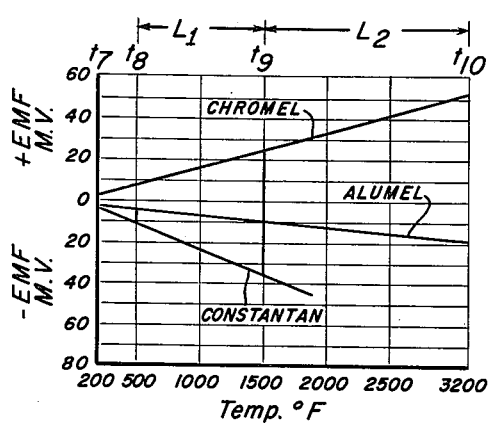
INVENTOR:
GEORGE E. DUNLOP,
BY: Donald G. Dalton
his Attorney.

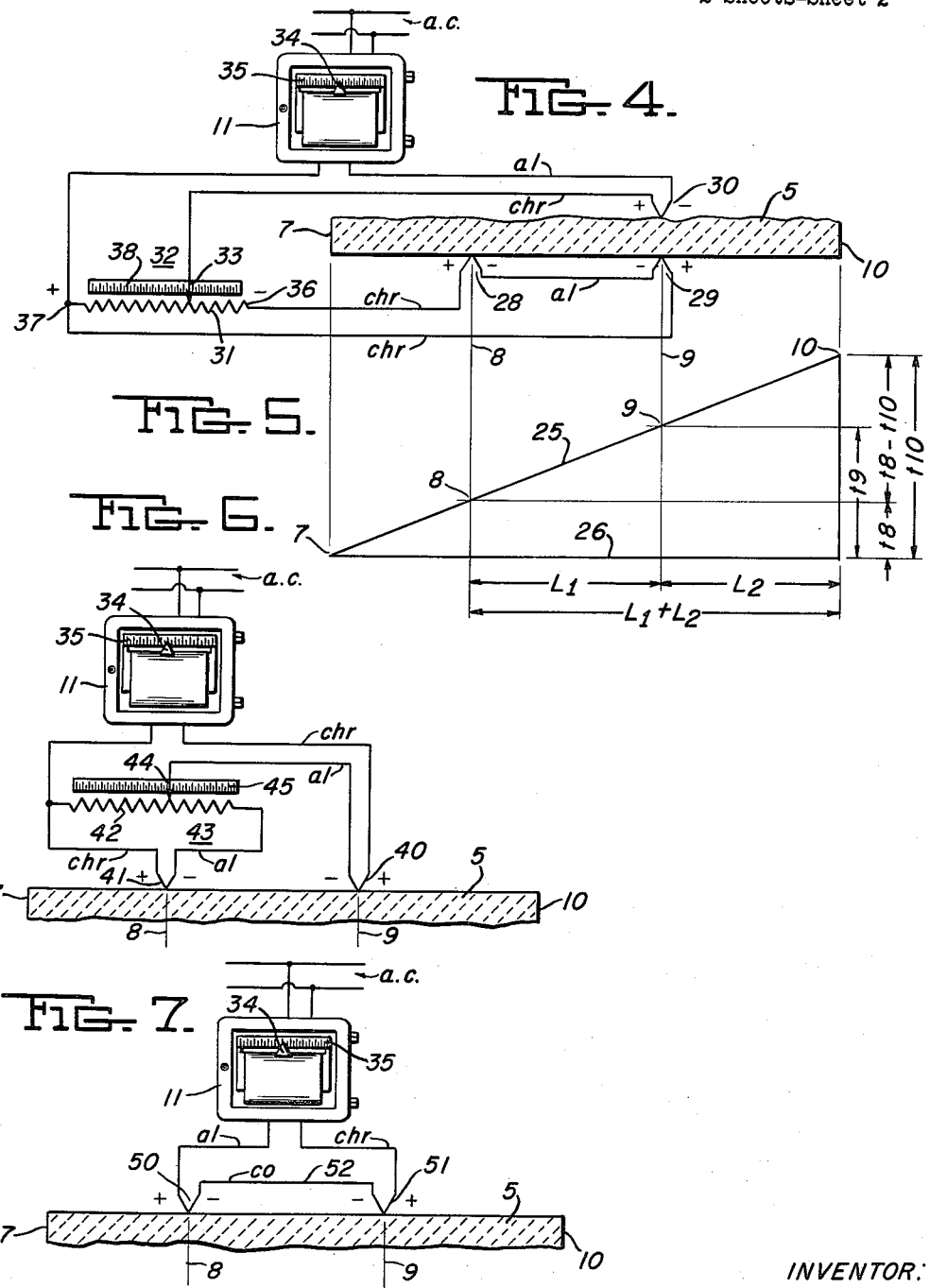

United States Patent Office 3,018,663
Patented Jan. 30, 1962

3,018,663
FURNACE LINING TEMPERATURE-THICKNESS
MEASURING APPARATUS
George E. Dunlop, Greensburg, Pa., assignor to United
States Steel Corporation, a corporation of New Jersey
Filed Sept. 13, 1956, Ser. No. 609,702
25 Claims. (Cl. 73—341)

This invention relates, as indicated, to a thermoelectric system for measuring the thickness and temperature of refractory walls or roofs in metallurgical furnaces. It is a thermoelectric pyrometer which, as distinguished from pyrometers operating at least in part on radiation principles, utilizes thermocouples for measuring temperatures at higher levels and under more corrosive conditions than can be handled by conventional thermocouple arrangements. In a manner to be described, the system of this invention includes a temperature calibrating circuit which furnishes an indication of the thickness of the furnace wall or body to which it is applied. More particularly it relates to a system for measuring roof temperature and roof thickness in open hearth furnaces.

Due to the extremely high temperatures involved, direct physical measurements of the thickness of the roof or walls cannot be made during operation of a metallurgical furnace. The problem of determining roof thickness is particularly troublesome in open hearth furnaces where operation is usually continuous during the expected roof life of several hundred heats. There is at present no known apparatus for the purpose of measuring roof thickness during operation of an open hearth and visual observation by an operator must be relied upon for a determination of its condition and remaining life.

In the operation of an open hearth furnace, the rate of fuel feed and factors such as draft, air supply and the like which affect flame conditions in the furnace must be regulated to prevent roof temperatures in excess of 3000° F. to 3200° F. since roof damage will result if higher temperatures are allowed. Temperatures of this nature are of course far above the operating range of base metal thermocouples as well as the range of noble metal couples such as those of platinum and platinum alloys. As a consequence, most conventional open hearth roof temperature indicators are of the total radiation type in which a lens focuses radiation from a selected point on the furnace roof against a thermopile. This type of indicator is subject to error since it will record reflected and other radiations and its operation is affected by smoky flame conditions in the furnace.

In addition to limitations against use by reason of temperature conditions, thermocouples cannot be exposed to the corrosive atmospheres which are present in an open hearth furnace. In view of these limitations, attempts to use thermocouples as roof temperature indicators have involved the use of refractory blocks as shields so that they will not be exposed to the corrosive atmosphere and will not be subject to the maximum furnace temperatures. However, such attempts have not proved satisfactory since the proposals for this purpose have resulted in inaccurate temperature readings after short periods of operation.

One of the primary objects of this invention is accordingly to provide a thermoelectric pyrometer for measuring open hearth roof temperatures in which thermocouples develop the entire information necessary to provide an indication of the temperature being measured. A further and incidental object of the invention is to provide a thermoelectric pyrometer of this character which may be utilized to furnish an indication of roof thickness.

Another object of the invention is to provide a thermoelectric pyrometer which measures the temperature gradient of a body in a region intermediate its ends to provide an indication of the temperature of one of the ends of such body.

A still further object of the invention is to provide a thermoelectric pyrometer for measuring the temperature of an open hearth roof which is comprised of a pair of thermocouples respectively located at spaced points and a circuit for combining the electro-motive forces developed by such thermocouples to provide an indication of the temperature at the inner surface of the roof. A still further object is to provide, in a pyrometer of this character, a heat flow indicator in the form of a body which has a uniform temperature gradient in the direction of heat transfer therethrough from a point subject to the temperature to be measured. In a manner to be described, the thermocouples in the pyrometer circuit of this invention are located at spaced points along the length of this body and furnish information concerning its temperature gradient which is used to produce the desired temperature indication.

A still further object of the invention is to provide a thermoelectric pyrometer in the form of a heat transmitting body having at least a pair of thermocouples located at spaced points between its ends for producing a voltage which varies with the slope of the temperature gradient between such ends and a circuit means which is operated by such voltage to indicate the temperature of one of the ends of the body.

A still further object of the invention is to provide a temperature indicator which comprises a body having one end subjected to a temperature to be measured and its other end at a lower temperature and a uniform temperature gradient between such ends, and a thermocouple circuit means for continuously examining such temperature gradient and for developing a voltage which varies proportionally with the temperature of the said one end of said body. Another object of the invention is to provide a temperature indicating pyrometer of this type in which the circuit means includes a thermocouple located at a point between the ends of the body. Still another object is to provide the body with provisions for constraining the transmission of heat to a flow in a direction between said ends which are preferably in the form of an insulating jacket about the body.

Other objects and advantages of the invention will become apparent from the following description.

In the drawings there are shown several embodiments of the invention. In this showing:

FIGURE 1 is a diagrammatic transverse sectional view through an open hearth furnace which illustrates the manner in which the pyrometer of this invention is applied to the furnace roof;

FIGURE 2 is an enlarged sectional view taken axially of the indicator shown in FIGURE 1;

FIGURE 3 is a sectional view taken substantially along the line III—III of FIGURE 2;

FIGURE 4 is a diagrammatic showing of the preferred form of thermocouple and potentiometer circuit which is used in the pyrometer of this invention;

FIGURE 5 is a graph for explanatory purposes which illustrates the shape of the temperature gradient of the body shown in FIGURE 4;

FIGURE 6 is a view similar to FIGURE 4 of a modified form of circuit and arrangement of thermocouples;

FIGURE 7 is a view similar to FIGURE 6 of a further modification; and

FIGURE 8 is a graph showing the E.M.F. (in millivolts) and temperature (° F.) relation between three base-metal alloys referred to platinum as a standard for comparison.

FIGURE 1 of the drawings shows the manner in which the pyrometer of this invention, designated as a whole by the numeral 1, is applied to the roof 2 of an open hearth furnace. While the illustrated arrangement is for the purpose of measuring the temperature of the roof at its inner surface 3, it is to be understood that the invention is applicable to the measurement of all wall temperatures and for other types of metallurgical furnaces where high temperatures are encountered. It is also adapted in a manner to be described to the purpose of measuring the temperature of atmospheres, for example, under smoky and corrosive conditions which would render conventional arrangements of thermocouples and radiation pyrometers unusable.

The pyrometer 1 includes a body 5 which is provided with a radiator 6 for dissipating heat from its outer end 7 to the atmosphere and for maintaining the end 7 at a lower and substantially constant temperature compared to the temperature being investigated. It also includes a potentiometric and thermocouple circuit of a character to be described which examines temperatures at spaced points 8 and 9 along the length of the body 5 for developing a voltage determined by the temperature gradient of the body 5 between its upper end 7 and its inner or lower end 10. The lower end 10 is subjected to the temperature being examined which in the case of the open hearth furnace application shown in FIGURE 1 is the temerature of the roof surface 3. This voltage is fed to a recording instrument 11 which is energized by A.C. supply conduits as indicated in the circuit diagram and is calibrated to indicate the temperature of the end 10 of the body 5.

In view of the high operating temperatures in an open hearth furnace, the body 5 should be fabricated of a refractory material. Because of its uniform temperature gradient and high thermal conductivity, a silicon carbide body is preferred. While this represents the preferred practice of the invention, it is to be understood however that bodies 5 of other materials may be employed for the purposes of this invention. When used for the purpose of determining furnace wall or roof thickness, the body 5 and the other materials of which the unit 1 is constructed should be materials which erode under the action of the furnace atmosphere at the same rate as the furnace wall or roof. This requirement is met by a silicon carbide body 5 since this material wears at substantially the same rate as the silica brick from which open hearth roofs are fabricated.

The preferred construction of the pyrometer unit 1 is shown in FIGURES 2 and 3 in which the body 5 is shown as being a rod of cylindrical shape. The rod has a sheath or covering of heat insulating refractory material 13 which is contained in an inner silicon carbide shell 14. To further insulate and strengthen the unit 1, a second layer of heat insulating material 15 in an outer silicon carbide shell 16 is provided about the inner shell 14. The opening 4 in which the unit 1 is received has an axial taper and the lower end 17 of the unit 1 has a corresponding taper with a ledge 18 at its upper end for limiting its movement into the opening 4. The upper end 19 of the inner shell 14 projects above the shell 16 and has a metal cap 20 secured thereto. The cap 20 has an opening 21 in which the upper end 7 of the rod 5 is received in snug heat transmitting engagement therewith. In this respect, the rod 5 and unit 1 project above the upper surface of the roof for the purpose of facilitating attachment of the cap 20 and heat radiator 6. The heat radiator 6 is comprised of metal heat transmitting arms secured to the cap 20 which have heat radiating fins for dissipating heat transmitted to the cap 20 from the rod 5 as rapidly as possible. An eyelet 22 at the upper end of the cap 20 is provided for engagement with a crane hook to raise and lower the unit 1 with respect to the opening 4.

The inner and outer shells 14 and 16 reinforce the unit 1 against breakage of the rod 5 during handling and the heat insulation of the materials 13 and 15 constrain the transmission of heat through the rod 5 to flow in an axial direction from its end 10 to its end 7. As a consequence, any change in the temperature or heat applied to the end 10 effects a change in the temperature gradient of the rod 5 between the ends 7 and 10. In a manner to be described, the temperature of the rod 5 is examined at the points 8 and 9 to develop information concerning the changes in this temperature gradient and this information is utilized to indicate the temperature of the end 10.

The preferred form of thermocouple and potentiometric circuit for examining temperatures at the points 8 and 9 is shown in FIGURE 4 and the showing in this figure should be considered in conjunction with the graph shown in FIGURE 5. In the graph of FIGURE 5, the line 25 shows somewhat diagrammatically the temperature gradient of the body 5 between its ends 7 and 10 and the horizontal line 26 designates its length. Since FIGURE 5 lies directly underneath FIGURE 4, the points 7, 8, 9 and 10 on the body 5 may be located on the graph by projecting vertically downwardly. The temperatures of these points are designated by the letters $t$ and the suffixes added to such letters indicate the points at which the temperatures are taken. The spacings of the points 8 and 9 relative to each other and to the end surface 10 are designated by the letters L. The distance of the point 9 from the end 10 is designated by $L_2$, and $L_1$ designates the distance between the points 8 and 9 along the rod 5. The graph thus shows the triangular relation of the temperatures and spacings of the points 7, 8, 9 and 10 and furnishes a basis for an understanding of the operation of the circuits shown in FIGURES 4, 6 and 7.

Referring to FIGURE 4, identical couples 28, 29, and 30 are located at the points 8 and 9 and, by way of example, these couples may be chromel-alumel couples which are connected in the circuit with the polarities indicated in the drawing. The only requirement as to their relative location is that the couples 29 and 30 be spaced from the end 10 a distance such that they will not be subjected to temperatures above their operating range and with a spacing relative to the couple 28 to be described. The couples 28 and 29 are connected in opposition to each other in a series circuit which includes the resistance 31 of a potentiometer 32 having a slide contact 33 adjustable along the length of the resistance 31. In this manner the resistance 31 is energized by a voltage $(t_8 - t_9)$ which varies according to the difference of the temperatures at the points 8 and 9. The slide contact 33 is connected in a circuit which includes the couple 30 and the indicator 11 in such manner that a voltage corresponding to the temperature at 9 $(t_9)$ plus a fraction of the difference between the temperatures at 9 and 8 is fed to the indicator 11. In a manner to be explained, this voltage varies directly as a function of the temperature at 10 under examination.

The indicator 11 is conventionally constructed and is preferably a null-balance voltage responsive instrument of the type, for example, produced by the Brown Instrument Company. Since its construction is specifically disclosed in U.S. Patent No. 2,423,540 to W. P. Wills, it will be sufficient to state that it includes a pointer 34 which is driven to positions along a scale 35 determined by the voltage fed to it and that the scale 35 is calibrated to indicate the temperature of the end 10.

In order that the voltage fed to the indicator 11 will vary in direct proportion to changes in temperature at the end 10, the slide wire 33 must be adjusted to a position along the potentiometric resistor 31 which is determined by the ratio of $L_2/L_1$. In this respect, and with reference to the graph of FIGURE 5, it can be shown mathematically that the temperature at 10 is definable in terms of the temperatures at 8 and 9 as follows:

$$t_{10} = t_9 + \frac{L_2}{L_1}(t_9 - t_8)$$

Since the particular arrangement of potentiometer 32 shown in FIGURE 4 is incapable of amplifying the voltage $(t_9 - t_8)$ developed by the thermocouples 28 and 29, it will be understood that the positions of the points 8 and 9 should be so located relative to the end 10 that the ratio of $L_2/L_1$ is not greater than unity. The point 9 is preferably arranged centrally with respect to the points 8 and 10 so that the ratio of $L_2/L_1$ will have a value of unity and, under this condition, the full value of the voltage ($t_9-t_8$) must be added to the voltage $t_9$ developed by the thermocouple 30. For this condition, the slide contact 33 will be positioned at the end 36 of the resistor 31.

It will be recalled that the unit 1 and its body 5 are constructed of materials which will erode at the same rate as the surface 3 of the roof 2. As a consequence, it will be seen that the ratio of $L_2/L_1$ will decrease as wear takes place and that the temperature reading of the indicator 11 will be higher than the actual temperature at 10 in the absence of an adjustment of the position of the slide contact 33 to compensate for the change in ratio of $L_2/L_1$ due to change in $L_2$ by reason of wear. This compensating adjustment of the position of the slide wire 33 to effect recalibration of the indicator 11 is made by first sighting an optical pyrometer against the roof surface 3 at a point adjacent the location of the end 10 to determine the actual roof temperature. If the temperature reading obtained in this manner is less than that indicated by the position of the pointer 34, then the position of the slide wire 33 must be adjusted by moving it toward the end 37 of the resistor 31 until the temperature indication of the pointer 34 coincides with the actual roof temperature. Each new position to which the slide wire 33 is adjusted in this manner thus represents a new ratio $L_2/L_1$ and will thus furnish an indication of the change in length of $L_2$ since there will be no change in the length of $L_1$. To indicate the remaining thickness of the roof outwardly of the point 9, a scale 38 is provided opposite the pointer 33 and is calibrated to show the length of $L_2$ and thus furnish an indication of the thickness or depth of roof outwardly of the point 9. When the slide wire 33 is positioned opposite the point 36, the scale 38 will indicate full wall thickness at $t_{10}$ and, if it is positioned opposite the point 37, it will indicate zero wall thickness at $t_9$. It will of course be appreciated that the thermocouples 29 and 30 will fail before the end 10 erodes away to the point 9 and that a zero reading on the scale 38 is thus theoretically impossible. If the unit 1 is to furnish a temperature reading during the entire life of the roof, the location 9 of the thermocouples 29 and 30 must be positioned sufficiently inwardly of the final theoretical roof thickness at which roof failure can be expected that failure of the thermocouples 29 and 30 by being subjected to excess temperatures in this manner will not take place before roof failure.

Referring again to FIGURE 5, and applying fundamental rules of plane geometry, the temperature at 10 may be expressed differently in terms of the temperatures at 8 and 9 as follows:

$$t_{10} = t_8 + (t_9 - t_8)\left(\frac{L_1 + L_2}{L_1}\right)$$

It can be shown mathematically that this expression will give the following:

$$t_{10}\left(\frac{L_1}{L_2 + L_1}\right) = t_9 - t_8\left(1 - \left(\frac{L_1}{L_1 + L_2}\right)\right)$$

According to this expression, the E.M.F. from $t_9$ must be opposed by a fraction of the E.M.F. from $t_8$. This expression is satisfied by a thermocouple arrangement as shown in FIGURE 6 in which identical thermocouples 40 and 41 are respectively located at the points 8 and 9. The output of the thermocouple 41 is connected across the resistor 42 of a potentiometer 43 having a slide contact 44 which is adjustable along the length of the resistor 42. The slide contact 44 is connected in series with the thermocouple 40 and the input terminals of an indicating instrument 11 which has A.C. energizing conduits as described above. In this manner, the resulting control voltage fed to the indicator 11 is comprised of the output voltage $t_9$ from the thermocouple 40 less a portion of the voltage $t_8$ developed by the thermocouple 41, and the position of the slide contact 44 determines the portion of the voltage $t_8$ which opposes the voltage $t_9$. As indicated above, this portion of opposing voltage is determined by the factor $$\left(1 - \frac{L_1}{L_1 + L_2}\right)$$

which is a maximum when the furnace has full wall thickness at $t_{10}$. Since change in the length of $L_2$ due to wear at the surface 10 decreases this factor, the indicator 11 must be recalibrated by moving the slide contact 44 to the left as viewed in FIGURE 6 to compensate for wear. Recalibration of the indicator 11 by adjustment of the position of the slide contact 44 is made according to actual furnace temperature readings from an optical pyrometer as described above in connection with FIGURE 4. A scale 45 is arranged opposite the pointer 40 and is calibrated to show the length of $L_2$ and thus furnish an indication of the roof thickness outwardly of the point 9.

In both of the embodiments shown in FIGURES 4 and 6, potentiometric circuits are required to combine in proper proportions the voltages generated by the couples at the points 8 and 9 so that the resulting control voltage fed to the indicator 11 will be a function of the slope of the temperature gradient 25 of the body 5. An embodiment of the invention which eliminates the necessity of a potentiometric circuit of this type is shown in FIGURE 7. In this showing, thermocouples 50 and 51 are respectively located at points 8 and 9 and are spaced with respect to the end 10 in a manner to be described. These couples are formed of three metal alloys, the couple 51 being a chromel-constantan couple and the couple 50 being an alumel-constantan couple as indicated in the drawings. A common constantan lead 52 connects the couples 50 and 51 with polarities as indicated and, thus eliminates external couples at the cold junctions therebetween which might otherwise introduce error. The use of the three metals indicated above in the couples 50 and 51 requires that $L_2$ (referring to FIGURE 5) must have a length of $8/10$ the length of $L_1$, that is, $L_2 = .8L_1$. With this specific arrangement, the voltage fed to the indicator 11 will vary proportionally with the temperature of the end 10 and the indicator 11 will furnish a reading of the temperature $t_{10}$.

Consideration of the graph shown in FIGURE 8 and its showing of the E.M.F. relation for the couple metals chromel, alumel, and constantan will furnish a further understanding of the manner in which the couples 50 and 51 operate to proportion the voltages fed to the indicator 11. From this showing, it will be seen that the chromel-constantan couple generates 63 millivolts at 1500° F. and that a chromel-alumel couple at the same temperature generates 35 millivolts. The chromel-constantan couple thus generates a voltage of about 1.8 times the voltage which would be generated by a chromel-alumel couple. The constantan-alumel couple at this temperature generates 28 millivolts or 0.8 times the voltage which would be generated by a chromel-alumel couple at the same temperature. To explain the manner in which these facors determine the relative lengths of $L_1$ and $L_2$, reference must be first made to the definition of the temperature $t_{10}$, mentioned above as follows:

$$t_{10} = t_8 + (t_9 - t_8)\left(\frac{L_1 + L_2}{L_1}\right)$$

The ratio of lengths between the points 8, 9 and 10 in this formula is a constant and if the letter B is substituted for this constant, then the above formula may be defined as follows:

$$t_{10} = Bt_9 - t_8(B-1)$$

Substituting the factor 1.8 for the constant B, this formula becomes:

$$t_{10} = 1.8t_9 - .8t_8$$

The specific thermocouple circuit in FIGURE 7 answers to this definition of $t_{10}$, for, referring it to identical chromel-alumel couples; it will be apparent that the chromel-constantan couple 51 develops 1.8 times the E.M.F. that would be generated by a chromel-alumel couple; and the alumel-constantan couple 50 develops .8 times the E.M.F. that would be generated by a chromel-alumel couple. Since $$1.8 = B = \left(\frac{L_2 + L_1}{L_1}\right)$$

it follows that $L_2 = .8L_1$, as stated above.

If $L_2$ is shortened in the embodiment of FIGURE 7 by erosion of the body 5 then an error will be introduced in the reading given by the indicator 11 and it will have to be calibrated so that the position of its pointer 34 will furnish an accurate reading. This recalibration may be affected by adjusting one of the potentiometric circuits or amplifiers (not shown) in the voltage responsive instrument 11. However, the adjustments required for this purpose will not be linear as in the adjustments of the potentiometers 32 and 43 in the embodiments of FIGURES 4 and 6.

While the use of a unit 1 having an insulated rod 5 of refractory or other material represents the preferred practice of the invention, it is to be understood that similar results may be obtained, for example, by omitting the unit 1 and by embedding a thermocouple or thermocouples at spaced points 8 and 9 in a refractory block of silica fire brick extending between the inner and outer surfaces 3 and 23 of the roof 2. In such case, the surfaces 3 and 23 of the fire brick would become the ends 7 and 10 in the circuits described above and the thermocouple points 8 and 9 would be located between such surfaces.

The use of a unit 1 containing a rod 5 is preferred for several reasons. In the body 5, silicon carbide is preferred because of its high thermal conductivity and linear temperature gradient. In addition, its use enables the outer end of the body 5 to be extended as shown in FIGURE 2 beyond the outer surface 3 of the furnace containing the temperature condition to be measured. The extension of length in this manner furnishes two desirable features in that it is possible to maintain the outer end 7 of the body 5 at a more constant temperature, as by use of the radiator 6, than would be possible with the outer surface 23 of an open hearth roof, and greater scope is permitted with respect to the relative location of the points 8 and 9 and the relative lengths of $L_1$ and and $L_2$. The unit 1 in providing heat insulation about the rod 5 is also more effective in constraining the transmission of heat therethrough to flow in a direction from its hot end 10 to its cold end 7.

While the pyrometer of this invention has been described in connection with its preferred application to the problem of measuring temperature and thickness of an open hearth roof, it will be understood that its principles are applicable to other problems such as measuring the temperature at a point spaced inwardly of a furnace wall or the measurement of the temperature of a corrosive atmosphere. It will be further understood that the body 5 may be constructed of metal when the temperature to be measured and corrosion factors are of a nature such that refractory material is not require.

While several embodiments of my invention have been shown and described it will be apparent that other adaptations and modifications may be made without departing from the scope of the following claims.

I claim:
1. A thermoelectric pyrometer comprising a body having one end subjected to a changing temperature and its other end at a lower temperature, a pair of thermocouples at spaced points between said ends, circuit means in which said thermocouples are connected and for producing a voltage varying with the slope of the temperature gradient between said ends, and means responsive to said voltage for indicating the temperature of said one end.

2. A thermoelectric pyrometer comprising a body having one end subjected to a changing temperature and its other end at a lower temperature, a heat insulating jacket about said body for constraining the transmission of heat therethrough from said one end to said other end, a pair of thermocouples respectively subjected to the temperature of said body at spaced points between said ends, and means including circuit means in which said couples are connected for indicating the temperature of said one end.

3. A pyrometer apparatus as defined in claim 2 characterized by said body having a radiator at said other end for removing the heat transmitted therethrough from said one end.

4. A thermoelectric pyrometer comprising a body having one end subjected to a changing temperature and its other end at a lower temperature, a pair of thermocouples at spaced points between said ends, circuit means in which said thermocouples are connected and for producing a voltage varying with the slope of the temperature gradient between said ends, means responsive to said voltage for indicating the temperature of said one end, and calibrating means for adjusting the operation of said circuit means to compensate for change in the length of said body between said ends.

5. A thermoelectric pyrometer comprising a body having one end subjected to a changing temperature and its other end at a lower temperature, a pair of thermocouples at spaced points between said ends, circuit means in which said thermocouples are connected and for producing a voltage varying with the slope of the temperature gradient between said ends, means responsive to said voltage for indicating the temperature of said one end, calibrating means for adjusting the operation of said circuit means to compensate for change in the length of said body between said ends, and means cooperating with said calibrating means for indicating the extent of its adjustment of said circuit means and thereby the change in length of said body.

6. A pyrometer as defined in claim 5 characterized by said last named means comprising a manually operable member for operating said calibrating means, a pointer actuated by said member, and a scale cooperating with said pointer for indicating the change in length of said body.

7. A thermoelectric pyrometer comprising a body having one end subjected to a changing temperature and its other end at a lower temperature, a pair of thermocouples differentially connected in series opposition and respectively subjected to the temperature of said body at spaced points between said ends, a third thermocouple subjected to the temperature of said body at the one of said points which is at the highest temperature, circuit means combining the output voltages of said thermocouples and for producing a control voltage comprised of the sum of the voltage output of said third thermocouple and a predetermined portion of the differential voltage output of said pair of thermocouples, and means operated by said control voltage for furnishing an indication of the temperature of said body at its said one end.

8. A pyrometer apparatus as defined in claim 7 characterized by said circuit means including a potentiometer comprised of a resistor connected in series with said pair of thermocouples, and a slide wire contact adjustable along said resistor in such manner that its position determines the portion of said differential voltage which is added to the output of said third thermocouple.

9. A pyrometer apparatus as defined in claim 8 characterized by said slide wire contact having a location along said resistor which is determined by the location of said points with respect to the said one end of said body.

10. A pyrometer apparatus as defined in claim 8 characterized by said slide wire contact having a location along said resistor which is determined by the ratio of the distance of the said one point from said body one end to the distance between said points.

11. A pyrometer apparatus as defined in claim 8 characterized by said potentiometer being calibrated in such manner that the relative position of its slide wire along said resistor furnishes an indication of the length of said body between said ends.

12. A thermoelectric pyrometer comprising a body having one end subjected to a changing temperature and its other end at a lower temperature, a pair of thermocouples respectively subjected to the temperature of said body at spaced points between said ends, circuit means for producing a control voltage comprised of the voltage output of the one of said thermocouples which is subjected to the highest temperature and a portion of the output voltage of the other of said thermocouples, and means operated by said control voltage for furnishing an indication of the temperature of said body at its said one end.

13. A pyrometer apparatus as defined in claim 12 characterized by said circuit means including a potentiometer comprised of a slide contact connected with said one thermocouple and a resistor having its terminals connected in series with said other thermocouple, said slide contact being adjustable along the length of said resistor.

14. A pyrometer apparatus as defined in claim 13 characterized by said potentiometer being calibrated so that the position of said slide contact relative to said resistor furnishes an indication of the length of said body between its said ends.

15. A thermoelectric pyrometer comprising a body having one end subjected to a changing temperature and its other end at a lower temperature, circuit means for generating a control voltage varying with the temperature of said one end comprising a pair of thermocouples respectively subjected to the temperature of said body at spaced points, between said ends, said thermocouples being comprised of three different metals one of which which is common to both thermocouples and consists of a wire extending therebetween, and means operated by said control voltage for furnishing an indication of the temperature of said body at its said one end.

16. A pyrometer apparatus as defined in claim 15 characterized by said points being located respectively at distances from said one body end such that the ratio of the distance of said one end from the more remote one of said points to the distance between said points is the same as the ratio of the E.M.F. produced by one of said couples to the E.M.F. produced by a thermocouple which is formed of the two metals connected by said common metal.

17. A thermoelectric apparatus for measuring the temperature of a metallurgical furnace comprising, the combination with a wall of said furnace, of a refractory body extending between the inner and outer surfaces of said wall, a pair of thermocouples differentially connected in series opposition and respectively subjected to the temperature of said body at spaced points between said wall surfaces, a third thermocouple subjected to the temperature of said body at the one of said points which is at the highest temperature, said one point being spaced from said inner wall surface a distance less than the distance between said spaced points, circuit means combining the output voltages of said thermocouples and for producing a control voltage comprised of the sum of the voltage output of said third thermocouple and a predetermined portion of the differential voltage output of said pair of thermocouples, and means operated by said control voltage for furnishing an indication of the temperature of said body at said inner wall surface.

18. An apparatus as defined in claim 17 characterized by said body having an insulating jacket for constraining the transmission of heat therethrough in a direction from said inner wall surface to said outer wall surface.

19. An apparatus as defined in claim 18 characterized by said body having a radiator at the end thereof adjacent said outer wall surface for removing heat transmitted therethrough from said inner wall surface.

20. An apparatus as defined in claim 17 characterized by said refractory body being composed of silicon carbide.

21. A thermoelectric apparatus for measuring the temperature of a metallurgical furnace comprising, the combination with a wall of said furnace, of a refractory body extending between the inner and outer surfaces of said wall, circuit means for producing a voltage varying with the slope of the temperature gradient of said body between said wall surfaces, means responsive to said voltage for indicating the temperature of said body at said inner wall surface, and calibrating means for adjusting the operation of said circuit means to compensate for change in the length of said body between said wall surfaces.

22. In a thermoelectric apparatus for measuring the temperature of a metallurgical furnace, the combination with a wall of said furnace, of a refractory body extending between the inner and outer surfaces of said wall, a pair of thermocouples differentially connected in series opposition and respectively subject to the temperature of said body at spaced points between said wall surfaces, a third thermocouple subject to the temperature of said body at the one of said points which is at the highest temperature, said one point being spaced from said inner wall surface a distance less than the distance between said spaced points, circuit means combining the output voltages of said thermocouples and for producing a control voltage comprised of the sum of the voltage output of said third thermocouple and a predetermined portion of differential voltage output of said pair of thermocouples, said portion comprising the product of said differential output voltage multiplied by the ratio of the distance of said one point from said inner wall surface to the distance between said spaced points, and means operated by said control voltage for furnishing an indication of the temperature of said body at said inner wall surface.

23. An apparatus as defined in claim 22 characterized by said circuit means including a potentiometer comprised of a slide contact connected in circuit with said third thermocouple, and a resistor having its terminals connected in series circuit with said pair of thermocouples, said slide contact being adjustable along the length of said resistor.

24. An apparatus as defined in claim 22 characterized further by said potentiometer being calibrated so that the position of said slide contact relative to said resistor furnishes an indication of the length of said body and thereby the thickness of said furnace wall.

25. In a thermoelectric apparatus for measuring the temperature of a metallurgical furnace, the combination with a wall of said furnace, of a refractory body extending between the inner and outer surfaces of said wall, a first thermocouple subject to the temperature of said body at a first point spaced from said inner wall surface, a pair of thermocouples differentially connected in series opposition and spaced apart relative to each other a distance greater than the distance between said first point and said inner wall surface, one of said pair of thermocouples being subject to the temperature of said body at said first point and the other of said pair of thermocouples being subject to the temperature of said body at a second point between said first point and said outer wall surface, circuit means combining the output voltages of said thermocouples and for producing a control voltage comprised of the sum of the voltage output of said first thermocouple and a predetermined portion of the differential voltage output of said pair of thermocouples, said predetermined portion comprising a fraction of said differential voltage corresponding to the ratio of the distances respectively between said first point and said inner wall surface and between said pair of thermocouples, and means operated by said control voltage for furnishing an indication of the temperature of said body at said inner wall surface.

References Cited in the file of this patent

UNITED STATES PATENTS

| | | |
|---|---|---|
| 1,232,408 | Thwing | July 3, 1917 |
| 1,489,644 | Luscombe | Apr. 8, 1924 |
| 1,528,383 | Schmidt | Mar. 3, 1925 |
| 1,837,853 | De Florez | Dec. 22, 1931 |
| 1,987,642 | Schueler | Jan. 15, 1935 |
| 2,102,955 | Hulme | Dec. 21, 1937 |
| 2,237,036 | Krogh | Apr. 1, 1941 |
| 2,323,715 | Kuehni | July 6, 1943 |
| 2,681,573 | Brown | June 22, 1954 |
| 2,695,219 | Upham | Nov. 23, 1954 |
| 2,798,377 | Brownlee et al. | July 9, 1957 |

FOREIGN PATENTS

| | | |
|---|---|---|
| 1,057,575 | France | Oct. 28, 1953 |